Oct. 13, 1964    O. B. CRUSE    3,152,521
FRICTION DEVICE OPERATING MECHANISM
Filed Aug. 2, 1962    3 Sheets-Sheet 1

INVENTOR
OLIVER B. CRUSE
BY *Gravely, Lieder & Woodruff*
ATTORNEYS

United States Patent Office 3,152,521
Patented Oct. 13, 1964

3,152,521
FRICTION DEVICE OPERATING MECHANISM
Oliver B. Cruse, Florissant, Mo., assignor to Wagner Electric Corporation, St. Louis, Mo., a corporation of Delaware
Filed Aug. 2, 1962, Ser. No. 214,318
7 Claims. (Cl. 92—63)

This invention relates to friction device operating mechanisms and in particular to those having releasable disabling means therein.

The principal object of the present invention is to provide a friction device operating mechanism having resilient means effective upon the failure of fluid pressure from a source of fluid pressure to mechanically energize a friction device normally energized by applying fluid pressure from said source to a fluid pressure responsive friction device actuator, and disabling means removably secured with said friction device operating mechanism and drivingly engageable with said resilient means to release the friction device energizing force thereof.

This and other objects and advantages of the present invention will become apparent hereinafter.

Briefly, the invention embodies a source of fluid pressure for a friction device operating mechanism having service means for normally energizing a friction device in response to fluid pressure applied thereto from said source and resilient means for mechanically energizing said friction device when the fluid pressure of said source is less than a predetermined value, and a driving member is removably secured with said friction device operating mechanism for cooperative engagement with said resilient means to release the friction device energizing force thereof.

Figure 1:
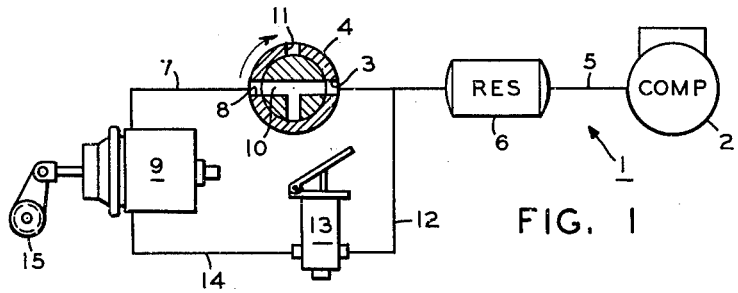
Figure 2:
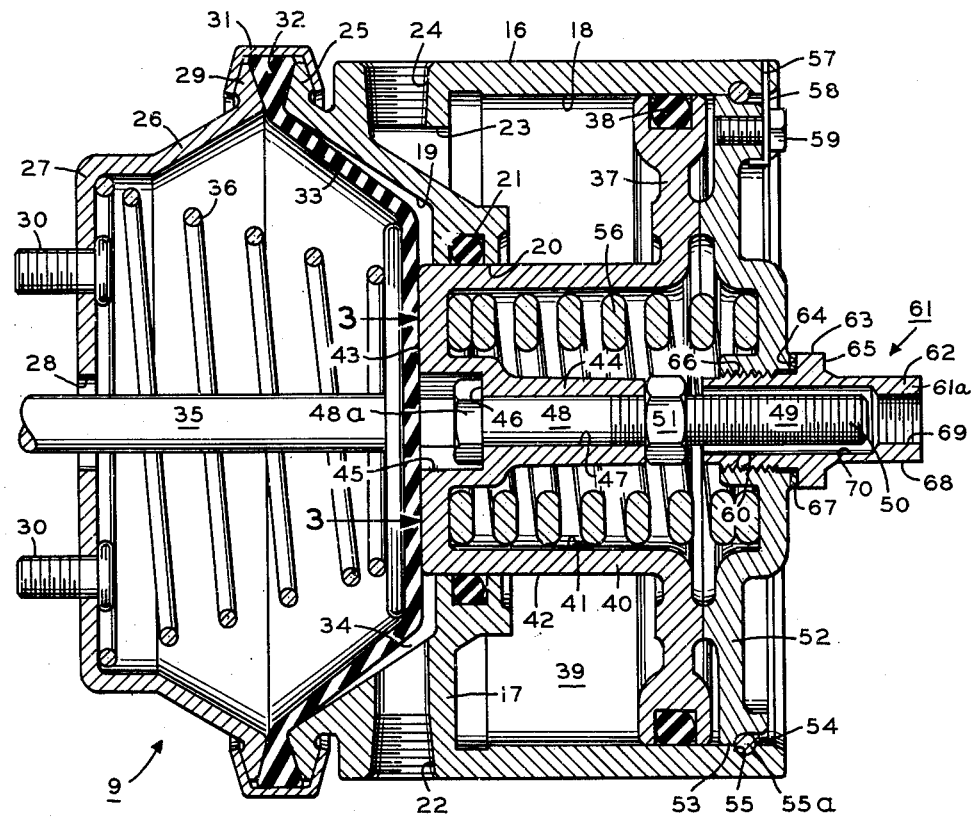
Figure 3:
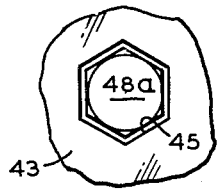
Figure 5:
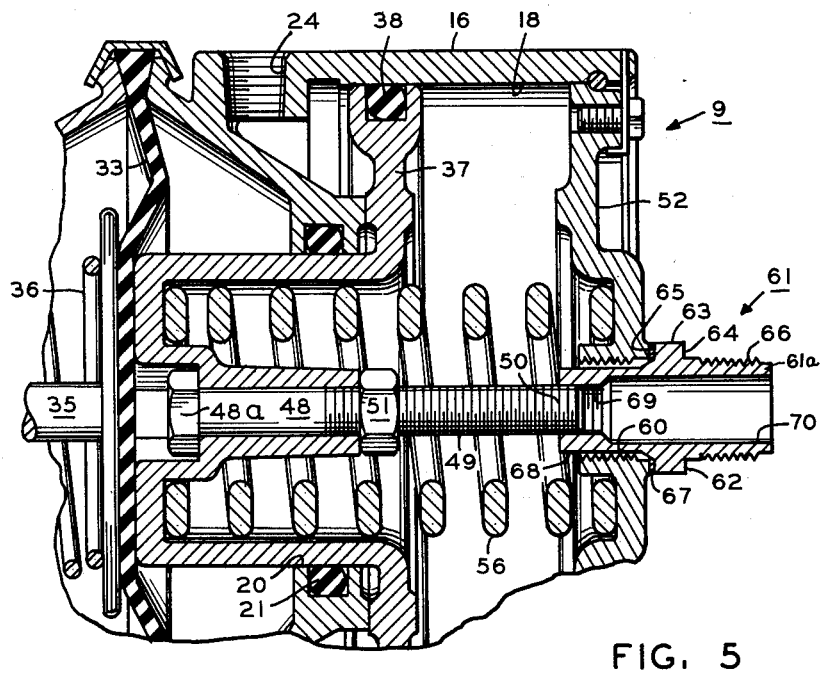
Figure 4:
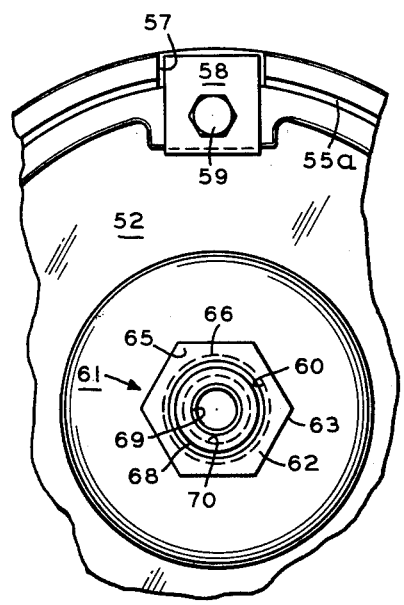
Figure 6:
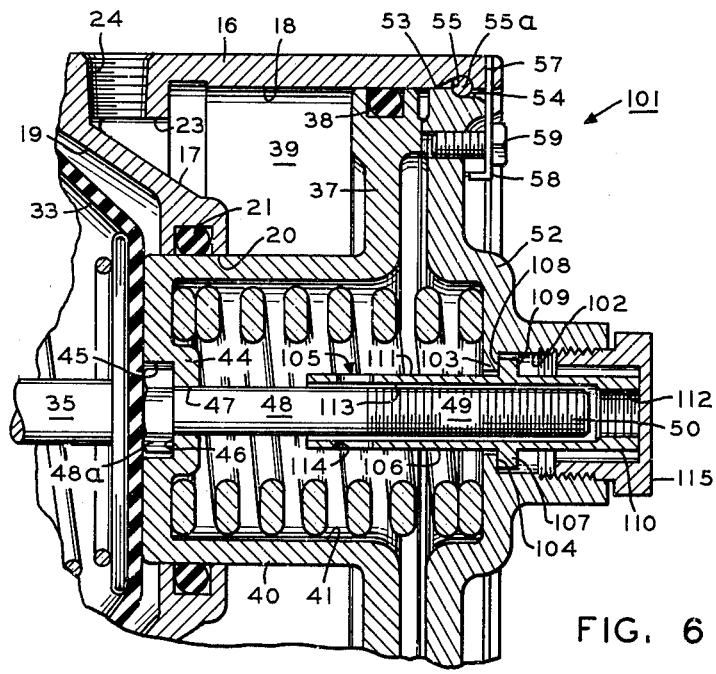

The invention also consists in the parts and arrangement and combination of parts hereinafter described and claimed. In the accompanying drawings which form a part of the specification and wherein like numerals refer to like parts wherever they occur:

FIG. 1 is a diagrammatic view of an actuating system for a friction device with the friction device operating mechanism embodying the present invention shown therein, FIG. 2 is a greatly enlarged cross-sectional view of the friction device operating mechanism shown in FIG. 1, FIG. 3 is a fragmentary left-end view of the power piston in the friction device operating mechanism of FIG. 2, FIG. 4 is a fragmentary right-end view of the friction device operating mechanism shown in FIG. 2, FIG. 5 is a fragmentary cross-sectional view showing the power piston of the friction device operating mechanism of FIG. 2 in an operating position and engaged with the disabling means, and FIG. 6 is a fragmentary cross-sectional view showing another embodiment of the present invention.

Referring now to FIG. 1 in detail, a friction device actuating system, indicated generally at 1, is provided with fluid pressure generating means, such as compressor 2, which is connected to an inlet 3 of a charging or control valve 4 by conduit 5, and a fluid pressure storage reservoir 6 is interposed in the conduit 5 providing, in combination with the compressor 2, a source of fluid pressure. Another conduit 7 is interposed between an outlet 8 of the charging valve 4 and the emergency port of a friction device operating mechanism or actuating cylinder 9. The charging valve 4 is provided with passage means 10 connecting the inlet 3 with the outlet 8; however, said charging valve can be rotated clockwise (in the direction of the arrow) positioning said passage means 10 to interrupt pressure fluid communication between said inlet and outlet and to establish pressure fluid communication between said outlet and an exhaust port 11 to vent said outlet to atmosphere. A conduit 12 has one end intersecting the conduit 5 and the other end thereof connecting with the inlet side of an application valve 13, and another conduit or service line 14 is interposed between the outlet or service side of said application valve and the service port of the actuating cylinder 9. To complete the system 1, the push rod of the actuating cylinder 9 is pivotally connected with linkage means or actuating lever, such as slack adjuster 15, for energizing a friction device (not shown).

The actuating cylinder 9, FIG. 2, is provided with a housing 16 having an annular wall 17 therein interposed between a bore 18 in the rightward end of said housing and a tapered bore 19 in the leftward end of said housing, and an aperture 20 having an O-ring seal 21 sealably disposed therein is centrally provided through the wall 17 between the bore 18 and tapered bore 19. A service port 22 which receives the conduit 14, as previously mentioned, is provided in the housing 16 connecting with the tapered bore 19, and a passage 23 has one end connecting with the bore 18 and the other end thereof connecting with an emergency port 24 which receives the conduit 7, as previously mentioned. The housing 16 is provided with a peripheral flange 25 on the leftward end thereof, and an end plate or fixed housing 26 is provided with a concave or dish-shaped end wall 27 having a centrally located venting aperture 28 therein and a peripheral flange 29 positioned in opposed relation with the flange 25. The end plate housing 26 is also provided with a plurality of mounting studs 30 which are fixedly attached to the end wall 27 by suitable means, such as an upset weld, said mounting studs being adapted for connection with a cooperating mounting bracket (not shown) on or adjacent the friction device.

A conventional, releasable clamping band 31 is positioned in clamping engagement with the opposed peripheral flanges 25 and 29 serving to maintain a peripheral bead 32 of a diagram 33 in sealable abutting engagement therebetween, and an actuating or service chamber 34 is formed in the tapered bore 19 between the diaphragm 33 and the housing wall 17 in pressure fluid communication with the service port 22. A push rod 35 extends coaxially through the venting aperture 28 having an exterior or working end pivotally connected with the slack adjuster 15, as previously mentioned, and an interior end biased into engagement with the diaphragm 33 by the compressive force of a return spring 36 interposed between the housing end wall 27 and said push rod.

An emergency or power piston 37 is slidably received in the housing bore 18 having an O-ring seal 38 disposed in the peripheral portion thereof in sealable engagement with said housing bore, and an emergency chamber 39 is formed in the housing bore 18 between the piston 37 and the housing wall 17 in pressure fluid communication with the passage 23 and emergency port 24. The piston 37 is provided with an integrally formed cylindrical portion or extension 40 having a bore 41 therein and a peripheral surface 42 thereon slidable in the aperture 20 of the housing wall 17 in sealing engagement with the seal 21 and a working end or end wall 43 is integrally provided on the leftward end of the piston extension 40 closing the bore 41, said end wall being positioned in the actuating chamber 34 normally in abutting engagement with the diaphragm 33. The piston extension end wall 43 is provided with a centrally located integrally formed projection 44 which extends coaxially into the piston extension bore 41, and as shown in FIGS. 2 and 3, a hexagonally shaped recess 45 is also provided in the piston end wall 43 forming a shoulder 46 in conjunction with an axial bore 47 which extends through the projection 44. A driven member or extension, such as stud 48, is received in the projection bore 47 and is provided with a hexagonally shaped head 48a on the leftward end thereof which is received in the cooperating hexagonaly-shaped recess 45 to prevent rotation of the driven member 48. The driven member 48 is threaded, as at 49, substantially between the mid-portion thereof and rightward or free end 50 thereof, and a lock nut 51 is cooperatively received on said threaded portion 49 in locking engagement with the rightward or free end of the projection 44 to abut the head 48a of the driven member 47 with the shoulder 46 and retain said driven member against axial movement.

A removable annular base wall 52, as shown in FIGS. 2 and 4, is provided with a peripheral surface 53 in sliding and guiding engagement in the rightward end of the housing bore 18, and an annular recess 54 is provided in said peripheral surface. The housing bore 18 is also provided with an annular recess 55 adjacent the rightward end thereof, and a split lock or retaining ring 56 is positioned in said housing recess 55. The compressive force of an emergency spring 56 interposed between the piston extension end wall 43 and the base wall 52 serves not only to bias the piston 37 and extension 40 in a leftwardly working direction but also serves to bias the base wall recess 54 into abutting engagement with the retaining ring 56 in the housing recess 55 to retain said base wall against displacement from the housing bore 18. The rightward end of the housing 16 is slotted at 57, and a wedge 58 which is fixedly attached to the base wall 52 by suitable means, such as stud 59, extends into the slot 57 to prevent rotation of said base wall in the housing bore 18. The base wall 52 is also provided with a threaded, centrally located access aperture 60.

Disabling means, indicated generally at 61, are provided with an invertible driving member 61a which is manually movable between a normal position in removable engagement with the access aperture 60 of the base wall 52 and an inverted position, said driving member serving not only as a closure member for the access aperture 60 but also as a tool, or the like, in its inverted position for driving engagement with the free end 50 of the driven member 48, as will be more fully described hereinafter. The invertible driving member 61a is provided with a body portion 62 having a hexagonally-shaped flange 63 integrally formed near the mid-portion thereof with abutment surfaces 64 and 65 on opposed sides of said flange. A threaded annular extension or portion 66 is provided on the body 62 leftwardly of the flange 63, and said threaded portion 66 is normally received in the threaded access aperture 60 so that the abutment surface 64 of the flange 63 is normally in locking engagement with a cooperating bearing member, such as a gasket 67, positioned between the flange 63 and the base wall 52 about the access aperture 60. Another annular extension or portion 68 is provided on the body 62 rightwardly of the flange 63 having a diameter less than that of the threaded portion 66 so as to be insertible into the access aperture 60 in the inverted position of the driving member 61a. The body 62 is also provided with an axial threaded bore 69 adjacent the rightward end thereof which is adapted for cooperative engagement with threaded portion 49 on the free end 50 of the driven member 48 when the driving member 61a is in its inverted position, to be discussed later, and a counterbore 70 extends coaxially leftwardly from the body bore 69, said counterbore 70 being substantially coaxial with the free end portion 50 of the driven member 48. Of course, the rightward end of the body bore 69 may be closed by a removable plug (not shown), if desired, to prevent the entry of foreign particles into the interior of the housing 16.

In the operation with component parts of the actuating cylinder 9, as above described, assume that normal operating conditions exist wherein the reservoir 6 is charged with pressure fluid above a predetermined amount from the compressor 2, and said reservoir is connected in fluid pressure communication with the emergency chamber 39 through the passage 23 and emergency port 24 of the housing 16, the conduit 7, the outlet 8 of the control valve 4, passage means 10 and inlet 3 and the conduit 5. The fluid pressure so transmitted to the emergency chamber 39 acts on the effective area of the emergency piston 37 creating an emergency force to position said emeregency piston in abutment with the base wall 52 and to overcome the compressive force of emergency spring 56 maintaining said spring in a compressed position. With the component parts of the actuating cylinder 9 positioned as above described and as shown in the drawings, the friction device (not shown) is deenergized.

If the operator desires to make a normal service application to energize the friction device and effect deceleration or a complete stop, a manual force applied on the application valve 13 meters fluid pressure from the reservoir 6 through the conduits 5 and 12, said application valve, the service line 14, the service port 22 of the housing 16, and into the service chamber 34. The fluid pressure so established in the service chamber 34 acts on the effective area of the diaphragm 33 to create a service force to move said diaphragm and push rod 35 leftwardly against the return spring 36 actuating the working end of said push rod to rotate the slack adjuster 15 and energize the friction device. Removal of the applied force from the application valve 13 effects the exhaustion of fluid pressure from the service chamber 34 through the service port 22, the conduit 14 and the exhaust port of the application valve 13 to eliminate the service force, and the compressive force of the return spring 36 moves the slack adjuster 15, the push rod 35, and the diaphragm 33 to their original positions.

In an emergency condition when the fluid pressure in the reservoir 6 is reduced below the predetermined amount due to leaks in the system 1 or a non-producing compressor 2, or the like, the fluid pressure in the emergency chamber 39 is correspondingly reduced thereby reducing the emergency force opposing the compressive force of emergency spring 56. When the magnitude of the spring force overcomes that of the reduced emergency force, the emergency spring 56 moves the emergency piston 37 leftwardly in a working direction in the housing bore 18 toward an operative position adjacent the housing wall 17, and the piston extension 40 is concertly moved with said emergency piston to actuate the leftward or working end 43 thereof in a work producing direction in the actuating chamber 34 effecting simultaneous leftward movement of the diaphragm 33 and push rod 35 to rotate the slack adjuster 15 and effect emergency energization of the friction device. During this emergency energization of the friction device, it should be noted that the operator may make a normal service application, as previously described; however, the fluid pressure introduced into the service chamber 34 acts on the effective area of the extension end wall 43 creating a force in opposition to the compressive force of the emergency spring 56 to prevent the compounding of the spring force and the service force.

With the component parts of the system 1 and actuating cylinder 9 positioned as above described, the friction device is energized to effect a vehicle emergency stop. Often such a vehicle emergency stop may occur at inopportune times and/or place the vehicle in a dangerous position with regard to other vehicles on the road; therefore, after such emergency stops occur, it is often advantageous to move the vehicle to a less dangerous position in order to correct the failure of the system 1 and subsequently establish normal operating conditions wherein the fluid pressure is greater than the predetermined amount.

The driving member 61a is provided to release the spring 56 and overcome the force thereof which energizes the friction device under emergency conditions, as described hereinafter. A manual force is applied on the driving member body flange 63 to rotate the driving member 61a which initially interrupts the locking engagement between the flange surface 64 and the bearing member 67 and subsequently disengages the threaded portion 66 of said driving member from threaded engagement with the access aperture 60 in order to move said driving member from said access aperture. The driving member 61a is then manually moved to its inverted position, as shown in FIG. 5, and the portion 62 is coaxially inserted through the access aperture 60 so that the driving member bore 69 becomes threadedly engaged with the threads 49 on the driven member free end 50. The driving member 61a is then threaded on the driven member 48 to place the flange surface 65 in bearing engagement with the bearing member 67 and base wall 52. After the driving member 61a is threadedly engaged with the driven member free end 50, a manual force applied on the driving member flange 63 rotates the driving member 61a on the bearing member 67 relative to the housing 16, and due to the threaded driving engagement between the driving member 61a and driven member 48, such rotation of said driving member effects concert rightward movement of the piston 37 and the extension 40 against the friction device energizing force of the spring 56. In view of the above, it is apparent that the driving engagement between the driving member 61a and driven member 48 established a rigid connection between the piston 37 and the base wall 52 which contains the friction device energizing force of spring 56 therebetween. When the driven member 48 and the piston 37 and extension 40 are concertly moved in a rightward direction for a predetermined distance, the friction device energizing force of the spring 56 is sufficiently overcome to de-energize the friction device so that the vehicle can be moved to a more advantageous and/or less dangerous position. Of course, the compressive force of the return spring 46 effects rightward movement of the component parts associated therewith in follow-up relation with the rightward movement of the working end 43 of the extension 40 in the actuating chamber 34 to rotate the slack adjuster 15 and effect the deenergization of the friction device. With the force of the emergency spring 56 so contained, the clamping band 31 can be removed to service the various component parts in the actuating chamber 34 without fear of the housing 16 being expelled from the fixed end plate 26 by the force of the emergency spring 56.

When the fluid pressure failure of the system 1 has been corrected and the fluid pressure in the reservoir 6 is increased to an amount greater than the predetermined amount wherein normal operating conditions are now reestablished, the fluid pressure in the emergency chamber 39 of the actuating cylinder 9 is correspondingly increased to re-establish the magnitude of the emergency force. When the magnitude of the emergency force overcomes that of the compressive force of the spring 56 so that the piston 37 and extension 40 are maintained in their non-operative positions by said emergency force, the driving member 61a may now be threadedly disengaged from the driving member free end 50 and returned to its original position in threaded engagement with the access aperture 60.

Of course, the operator may initiate the emergency function of the actuating cylinder 9, if desired, by "dynamiting" the system 1. To "dynamite" the system 1, the operator merely rotates the charging valve 4 in a clockwise direction (as shown by the arrow in FIG. 1) to align the passage means 10 between the outlet 8 and the exhaust port 11 thereby exhausting fluid pressure from the emergency chamber 39 of the actuating cylinder 9 through the passage 23 and emergency port 24 into conduit 7 and therefrom via said outlet, passage means and exhaust port of the charging valve 4 to atmosphere. With the emergency chamber 39 vented to atmosphere, the emergency function of the actuating cylinder is initiated, as described hereinbefore, to energize the friction device.

Referring now to FIG. 6, a friction device operating mechanism 101 is shown having substantially the same component parts and functioning in the same manner as the previously described friction device operating mechanism 9 with the following exceptions. The base wall 52 is provided with a threaded access aperture 102 having a radially inwardly extending flange 103 integrally formed adjacent the interior or leftward end thereof; said flange 103 being provided with an annular bearing surface 104. Disabling means or driving member 105 is provided with a body 106 having an annular bearing flange 107 integrally formed near the mid-portion thereof with bearing surfaces 108 and 109 on opposite sides thereof. The body 106 is also provided with annular extensions or portions 110 and 111 rightwardly and leftwardly of the flange 107, and the diameter of the body 106 throughout said annular portions 110 and 111 is less than that of the access aperture flange 103 so that either annular portion is insertible through said access aperture flange. A threaded axial bore 112 is provided in the rightward end of the body 106 for cooperative engagement with the threaded portion 49 in the free end 50 of the driven member 48, and a counterbore 113 extends coaxially with the bore 112 through the body 106 in coaxial spaced relation with the driven member free end 50. Tool receiving cross-passages 114 are provided in the body 106 adjacent the leftward end of the counterbore 113, and an end cap 115 is threadedly received in the access aperture 102 in abutment with the rightward end of the driving member body 106 normally positioning the bearing surface 108 of the body flange 107 in engagement with the bearing surface 104 of the access aperture flange 103 and also preventing the entry of foreign particles into the housing bore 18.

It is now apparent that a novel friction device operating mechanism or actuating cylinder meeting the objects set out hereinbefore is provided and that changes and modifications in the disclosure may be made by those skilled in the art without departing from the spirit of the invention as defined by the claims which follow.

What I claim is:

1. A friction device operating mechanism comprising a housing having a bore therein with opposed end walls, an end plate, a diaphragm clamped between said housing and end plate, an actuating chamber in said housing between said diaphragm and one of said end walls, a push rod connected with said diaphragm and having a working end extending exteriorly of said end plate, means for introducing fluid pressure into said actuating chamber, said diaphragm being movable in response to fluid pressure in said chamber to actuate said push rod and the working end thereof, a bore in said one end wall between said actuating chamber and housing bore, a piston slidable in said housing bore and having an integral extension slidable in said one end wall bore, said piston extension having a working end in said actuating chamber normally engaged with said diaphragm, a threaded access aperture in the other of said end walls connecting with said housing bore, a spring interposed between said other end wall and piston extension, an emergency chamber in said housing bore between said one end wall and piston, means for introducing fluid pressure into said emergency chamber, said spring normally urging said piston in a working direction toward engagement with said one end wall to actuate said piston extension and the working end thereof and effect concert movement of said diaphragm, said push rod and the working end thereof when the fluid pressure in said emergency chamber is less than a predetermined amount, a bore in said piston extension, a threaded member positioned in said piston extension bore and extending coaxially toward said access aperture, and disabling means for said piston including an invertible driving member having a body portion, a radially extending flange on said body portion normally in bearing engagement with said other end wall exteriorly of said housing bore, a pair of cylindrical extensions disposed on opposite sides of said flange, one of said cylindrical extensions being threadedly engaged with said access aperture and the other of said cylindrical extensions having a lesser diameter than said one cylindrical extension, an axial bore and counterbore extending through said body portion, said counterbore being coaxial with said threaded member and said bore being threaded for engagement with said threaded member, said driving member being invertible wherein said one cylindrical extension is threadedly disengaged from said access aperture and said other cylindrical extension is inserted coaxially into said access aperture to effect threaded engagement between said body portion bore and threaded member and reposition said flange in bearing engagement with said other end wall, and means on said flange for applying a force thereto to rotate said driving member and further threadedly engage said body portion bore with said threaded member and effect movement of said piston in a non-working direction toward said other end wall against said spring to de-energize the working end of said piston extension.

2. A friction device operating mechanism comprising a housing having a bore therein and opposed end walls, piston means slidable in said bore and having oppositely disposed extensions, one of said piston extensions having a working end extending exteriorly of said bore, an access aperture in one of said end walls, the other of said piston extensions having a free end substantially coaxial with said access aperture, spring means normally urging said piston means in a working direction to energize the working end of said one piston extension, and disabling means for said piston means including a driving member invertible between two positions, a flange on said driving member, a pair of cylindrical extensions disposed on opposite sides of said flange, one of said cylindrical extensions being removably secured with said access aperture in one invertible position of said driving member and the other of said cylindrical extensions being insertible into said access aperture in the other invertible position of said driving member, and threaded means in said driving member drivingly engageable with said free end of said other piston extension when said other cylindrical extension is inserted into said access aperture, said driving member being rotatable in response to an applied force to position said flange in bearing engagement with said housing and drivingly engage said threaded means with said free end of said other piston extension to effect movement of said piston means in a non-working direction against said spring means and de-energize the working end of said one piston extension.

3. A friction device operating mechanism comprising a housing having a bore therein with opposed end walls, an end plate, a diaphragm clamped between said housing and end plate, an actuating chamber in said housing between said diaphragm and one of said end walls, a push rod connected with said diaphragm and having a working end extending exteriorly of said end plate, means for introducing fluid pressure into said actuating chamber, said diaphragm being movable in response to fluid pressure in said actuating chamber to actuate said push rod and the working end thereof, a bore in said one end wall between said actuating chamber and housing bore, a piston slidable in said housing bore and having an integral extension slidable in said one end wall bore, said piston extension having a working end in said actuating chamber and normally engaged with said diaphragm, a threaded access aperture in the other of said end walls connecting with said housing bore, a spring interposed between said other end wall and piston extension, an emergency chamber in said housing bore between said one end wall and piston, means for introducing fluid pressure into said emergency chamber, said spring normally urging said piston in a working direction toward engagement with said one end wall to actuate said piston extension and the working end thereof and effect concert movement of said diaphragm, said push rod and the working end thereof when the fluid pressure in said emergency chamber is less than a predetermined amount, a bore in said piston extension, a threaded member positioned in said piston extension bore and extending substantially coaxial with said access aperture, and disabling means for said piston including a driving member invertible between two positions, a flange on said driving member, a pair of cylindrical extensions disposed on opposite sides of said flange, one of said cylindrical extensions being releasably secured in said access aperture in one invertible position of said driving member and the other of said cylindrical extensions being insertible into said access aperture in the other invertible position of said driving member, and threaded means in said driving member drivingly engageable with said threaded member when said other cylindrical extension is inserted into said access aperture, said driving member being rotatable in response to an applied force to position said flange in bearing engagement with said housing and drivingly engage said threaded means with said threaded member to effect movement of said piston in a non-working direction against said spring and deactuate the working end of said piston extension.

4. A friction device operating mechanism comprising a housing having a bore therein with opposed end walls, piston means slidable in said bore and having oppositely disposed extensions, one of said piston extensions having a working end extending exteriorly of said bore, an access aperture in one of said end walls, the other of said piston extensions having a threaded end substantially coaxial with said access aperture, spring means normally urging said piston means in a working direction to energize the working end of said one piston extension, and disabling means for said piston including an invertible driving member having a body portion, a radially extending flange in said body portion normally in bearing engagement with said other end wall exteriorly of said housing bore, a pair of cylindrical extensions disposed on opposite sides of said flange, one of said cylindrical extensions being threadedly engaged with said access aperture and the other of said cylindrical extensions having a lesser diameter than said one cylindrical extension, an axial bore and counterbore extending through said body portion, said counterbore being substantially coaxial with said other piston extension and said bore being threaded for engagement with the threaded end of said other piston extension, said driving member being invertible wherein said one cylindrical extension is threadedly disengaged from said access aperture and said other cylindrical extension is inserted coaxially into said access aperture to effect threaded engagement between said body portion bore and the threaded end of said other piston extension and reposition said flange in bearing engagement with said one end wall, and means on said flange for applying a force thereto to rotate said driving member and further threadedly engage said body portion bore with said other piston extension to effect movement of said piston means in a non-working direction against said spring means to de-energize the working end of said one piston extension.

5. A friction device operating mechanism comprising a housing having a bore therein, piston means slidable in said bore and having a working end thereon extending exteriorly of said bore, an access aperture in said housing, threaded means on said piston means and substantially coaxial with said access aperture, spring means normally urging said piston means in a working direction to energize the working end thereof, a disabling member having opposite end portions, either of said end portions being insertible into said access aperture, one of said end portions being threadedly engaged with said access aperture when inserted therein to removably secure said disabling member in said housing, the other of said end portion when inserted into said access aperture being in bearing engagement with said housing and threadedly engaged with said threaded means in said piston means, said disabling member being rotatable in response to an applied force thereon to further threadedly engage said other end portion with said threaded means in said piston means and move said piston means in a non-working direction to de-energize the working end thereof.

6. A friction device operating mechanism comprising a housing having a bore therein, piston means slidable in said bore and having a working end thereon extending exteriorly of said bore, an access aperture in said housing connecting with said bore, a threaded extension on said piston means extending toward said access aperture and being substantially coaxial with said access aperture, spring means interposed between said housing and piston means and normally urging said piston means in a working direction to energize the working end thereof, an invertible disabling member normally removably secured in said access aperture and having a free end portion in bearing engagement with said housing and extending coaxially into said access aperture in the inverted position of said invertible disabling member, threaded means in said free end portion in threaded engagement with said threaded piston extension when said disabling member is inverted, and tool receiving means on said disabling member for applying a force to rotate said disabling member relative to said housing and further threadedly engage said threaded means and piston extension to move said piston means in a non-working direction against said spring means and de-energize the working end thereof.

7. A friction device operating mechanism comprising a housing having a bore therein, piston means slidable in said bore and having a working end thereon extending exteriorly of said bore, an access aperture in said housing connecting with said bore, a threaded extension on said piston means substantially coaxial with said access aperture, spring means normally urging said piston means in a working direction to energize the working end thereof, a disabling member movable between a normal position in removable engagement with said access aperture and an inverted position in coaxial spaced relation with said access aperture, threaded means in said member drivingly engageable with said threaded piston extension when said disabling member is moved to the inverted position, flange means on said disabling member for bearing engagement with said housing in the inverted position of said disabling member, said driving member being rotatable to effect the driving engagement between said threaded means and piston extension and the bearing engagement between said flange and housing to move said piston means in a non-working direction against said spring means and de-energize the working end of said piston means.

References Cited in the file of this patent

UNITED STATES PATENTS

| | | |
|---|---|---|
| 2,754,805 | Beman | July 17, 1956 |
| 3,090,359 | Hoppenstand | May 21, 1963 |